United States Patent [19]

Gerlach

[11] Patent Number: 5,093,734
[45] Date of Patent: Mar. 3, 1992

[54] DIGITIZING SCANNING APPARATUS

[76] Inventor: Richard K. Gerlach, 32 Santa Bella Rd., Rolling Hills Estates, Calif. 90274

[21] Appl. No.: 411,542

[22] Filed: Sep. 22, 1989

[51] Int. Cl.⁵ .................................................. H04N 1/04
[52] U.S. Cl. .................................. 358/474; 358/475; 358/487; 358/496
[58] Field of Search .............. 353/406, 464, 471, 474, 353/475, 486, 487, 496

[56] References Cited

FOREIGN PATENT DOCUMENTS 60-244152 12/1985 Japan .................................. 358/487

Primary Examiner—Edward L. Coles, Sr.
Attorney, Agent, or Firm—Robert J. Schaap

[57] ABSTRACT

A digitizing scanning apparatus for scanning and recording an image in digital form for ultimate reproduction. The image preferably adopts the form of or is included in a light transmissive document such as an X-ray film or the like. The document is moved in a first direction through the apparatus in a document feeding path and exposed to a source of light which extends transversely with respect to the direction of movement of the document and is located with respect to a scanning element, such as a charge coupled diode. As the document is moved into the housing past the charge coupled diode, light levels are calibrated for the dark and light areas of the document. The document is then moved in a second direction, opposite the first direction, and data is read from the document and digitized and stored in a central storage for ultimate reproduction. A unique drive system is provided for moving the document in both directions in the document feeding path. The drive mechanism comprises a plurality of floating idler rollers with drive rollers disposed therebeneath. The idler rollers are mounted for vertical shiftable movement so that a document having a thickness greater than the gap between the drive rollers and the idler rollers can bias the idler rollers in response to movement of the document. Adjustment screws are provided for adjusting the tension of the idler rolelrs. The apparatus also provides a unique scan calibrating system which calibrates the document being scanned and which also defuses the light so as to avoid creation of light streaks on the image.

14 Claims, 3 Drawing Sheets

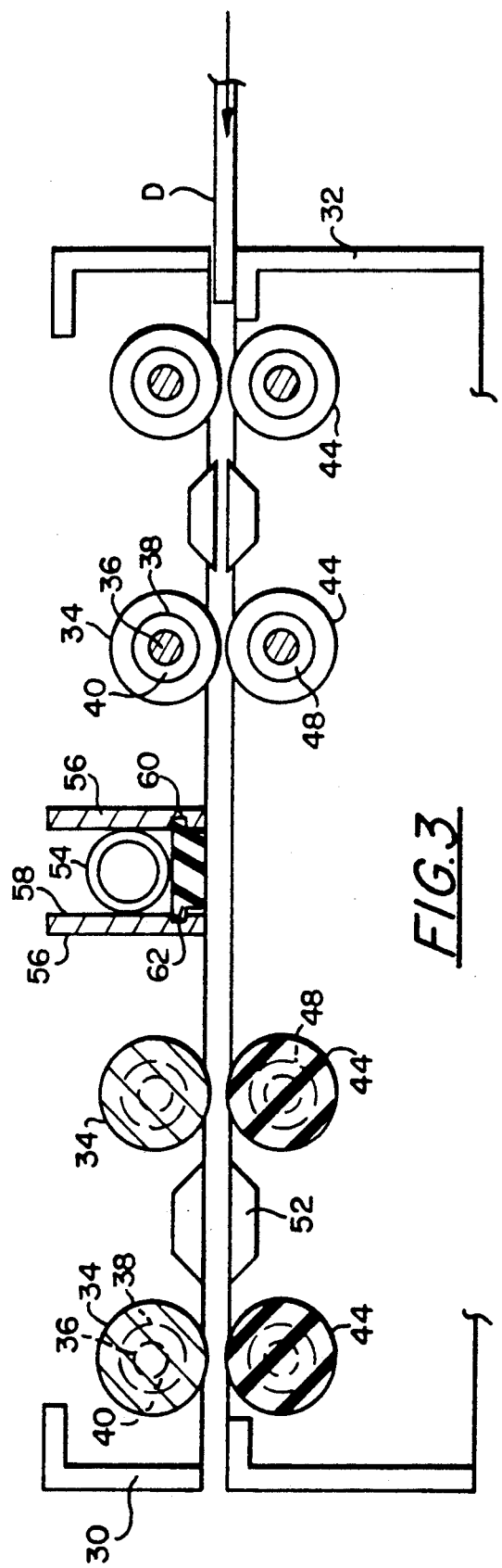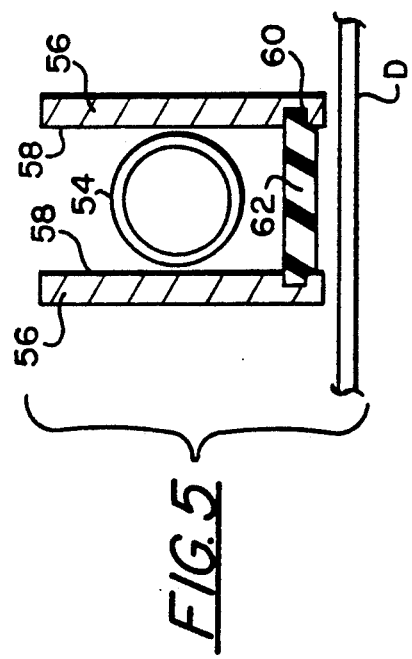

DIGITIZING SCANNING APPARATUS

BACKGROUND OF THE INVENTION

1. Field of the Invention

This invention relates in general to certain new and useful improvements in digitizing scanning apparatus, and more particularly, to an improved digitizing scanning apparatus which provides a unique drive mechanism and which also permits prescanning for calibration compensating for non-linearities in light distribution from a light source.

2. Brief Description of the Prior Art

In recent years, there has been an increased interest in digital scanning apparatus for purposes of document control and document storage. Most digital scanners utilize movement of a scanning element with respect to a plate on which an image to be copied is located. Relative movement exists between the plate which holds the image and the scanning element. Electrical signals generated by the scanning element are then stored in a computer storage for re-generation of the original image.

Electronic digitizing scanners are still in their relative infancy in the electronics industry and the presently available digitalizing scanners are somewhat rudimentary and overly complex in their construction and in their operation.

In one prior art digitizing scanning apparatus, a document was moved through a scanning path by means of a drive mechanism which relied upon drive rollers and cooperating idler rollers. However, the idler rollers and the drive rollers were fixed in position relative to one another in order the create a gap approximately the size of the thickness of the document being fed. There was no adjustability provided and therefore, if there was a thicker document, a greater amount of driving pressure was imposed upon the document. In like manner, if the document was thinner than the gap, there was insufficient pressure imposed upon the document to move the same at a proper speed through the scanning path.

Another one of the problems inherent in the prior art digitizing scanning apparatus is the fact that any calibration did not properly account for non-linearities in a light source. In co-pending U.S. Pat. application Ser. No. 094,398 filed Sept. 8, 1987, there is provided a digitizing scanning apparatus which utilizes an elongate tube source of light. In this case, the light was disposed transverse to the direction of movement of a document to be scanned thereby creating segments of a lighted area. In this way, successively lighted segments could be successively scanned.

In this prior art apparatus, attempts were made to compensate for any non-linearities in the light source. Thus, if there was a dark spot on the light source, an integration of the light across the transverse direction would attempt to compensate for and integrate light and dark areas. However, this integration did not account for the fact that light from a dark spot on the light source was also mixed with light from adjacent areas thereby partially cancelling out the effect of the dark spot. Thus, there was an over integration of the light to account for any dark spot and this resulted in light streaks on the image itself when reproduced.

OBJECTS OF THE INVENTION

It is, therefore, one of the primary objects of the present invention to provide a digitizing scanning apparatus which provides a unique drive mechanism in which idler rollers are adjustably biased with respect to drive rollers.

It is another object of the present invention to provide a digitizing scanning apparatus of the type stated in which the driving pressure on all documents, regardless of the thickness of the document, is essentially the same.

It is a further object of the present invention to provide a digitizing scanning apparatus of the type stated in which integration for non-linearities in light can obtain a rather uniform light distribution profile against which scanning can be conducted.

It is an additional object of the present invention to provide a digitizing scanning apparatus of the type stated which provides for uniform light distribution by utilizing a somewhat translucent mask between a light source and a scanning element.

It is yet another object of the present invention to provide a method for moving a document through a scanning apparatus in one direction for purposes of calibrating and in an opposite direction for purposes of reading and recording information from the document.

With the above and other objects in view, my invention resides in the novel features of form, construction, arrangement and combination of parts presently described and pointed out in the claims.

BRIEF SUMMARY OF THE INVENTION

In general terms, the present invention relates to a digitizing scanning apparatus for scanning and recording an image for ultimate reproduction. In a more preferred embodiment, the scanning apparatus is designed to scan light transmissive documents, such as X-ray documents and the like.

In the apparatus as provided, there is a unique drive means which moves the document in a first direction into the housing and between a light source and a scanning element, such as a charge coupled diode. During this initial movement, the light and dark areas of the document are read in order to calibrate for all light and dark area of the document. In this way, there is a standard profile against which reading can be conducted. The document is then moved in the opposite direction outwardly of the housing. During this latter movement, the information on the document may be read and digitized and recorded.

The drive mechanism is unique in that it provides a plurality of idler rollers with somewhat softer drive rollers disposed therebeneath. The idler rollers are effectively floated to a limited degree so that they can biased upwardly and downwardly. Adjustment screws, such as set screws, are provided for adjusting the degree of movement of the idler rollers.

In accordance with this construction, the idler rollers are set to form a gap between the idler rollers and the drive rollers which has a dimension less than the thickness of the document to pass in the scanning path. In this way, when a document enters into the scanning path, it can push the idler rollers upwardly. Accordingly, a constant amount of pressure is maintained on all documents regardless of the thickness of the documents.

A unique light source is provided with the drive means that includes an elongate lamp extending across the transverse dimension of the document feeding or scanning path and hence in a direction transverse to the movement of a document. The light source may preferably adopt a form of a florescent light or similar light source which potentially provides a uniform light distribution from one end to the other.

In prior art scanning apparatus, examination was made of every pixel value and adjusted in order to provide a straight line distribution which was determined arbitrarily to be 100 percent. This allegedly took into consideration the dark and light areas in a light source. However, as previously stated, this averaging did not account for the fact that a dark spot on a light source did not necessarily provide a totally dark spot in a pixel inasmuch as light from areas adjacent to the dark spot also impinged on the image at the same point light would have impinged upon the image from the light source if the dark spot were not present. This rendered a false light increase during calibration.

The present invention overcomes this rather substantial problem by the very simple provision of a translucent defuser located between the light source and the image itself. In this way, if there were any uneven light distribution from the light source, that distribution would be defused in the light defuser. Thus, when calibrating, there is a more accurate integration of all dark and light areas. In effect, calibration now occurs through the defuser.

The defuser is essentially milky in color so that it is translucent permitting distribution of light but is obviously not transparent. In effect, approximately 50 percent of the light from the light source reaches the document by the use of this defuser. Nevertheless, all areas transverse in a segment of the document being scanned are integrated in order to calibrate for subsequent reading of the document.

In other unique aspect of the invention, light from the light source passing through the light transmissive document is projected from a prism in first direction to a mirror. The light is then bounced back in a second direction opposite to the first direction through a lens and on to the scanning element. In this way, it is possible to provide a very short and compact arrangement of components and yet still maintain a light path of required light.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention, but it is to be understood that such detailed description is not to be taken in a limiting sense.

BRIEF DESCRIPTION OF THE DRAWINGS

Figure 1:
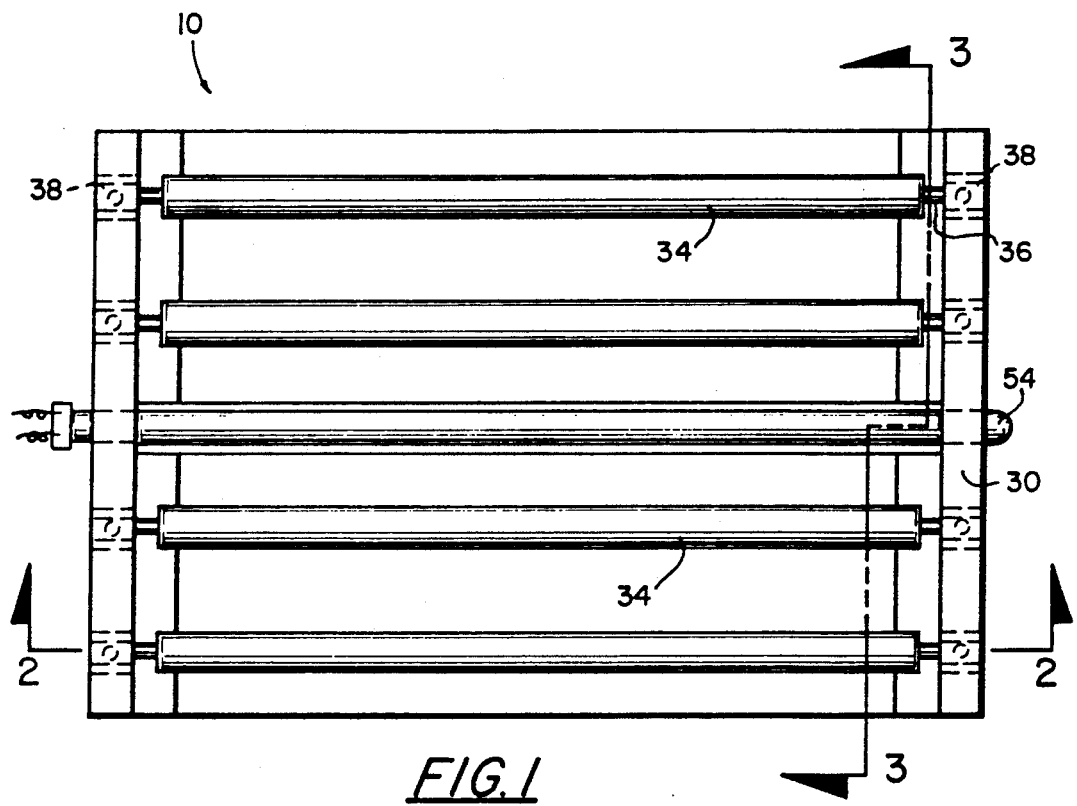
Figure 2:
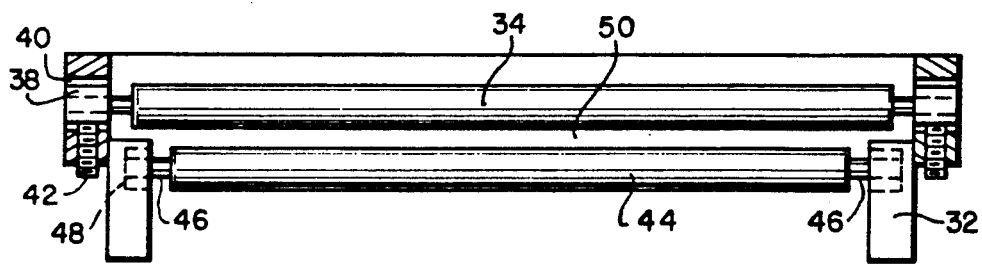
Figure 4:
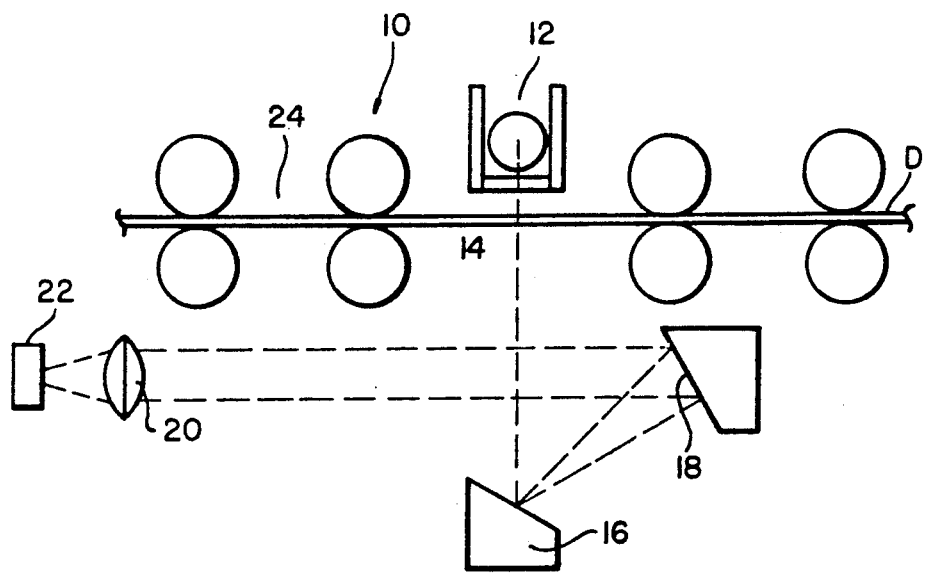
Figure 6:
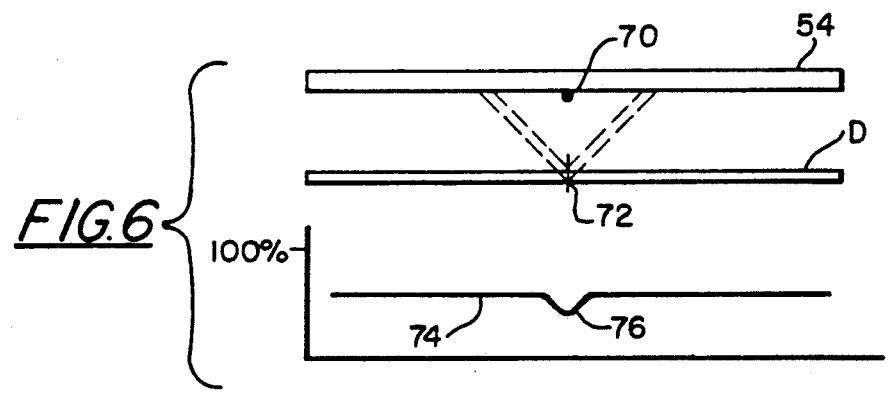
Figure 7:
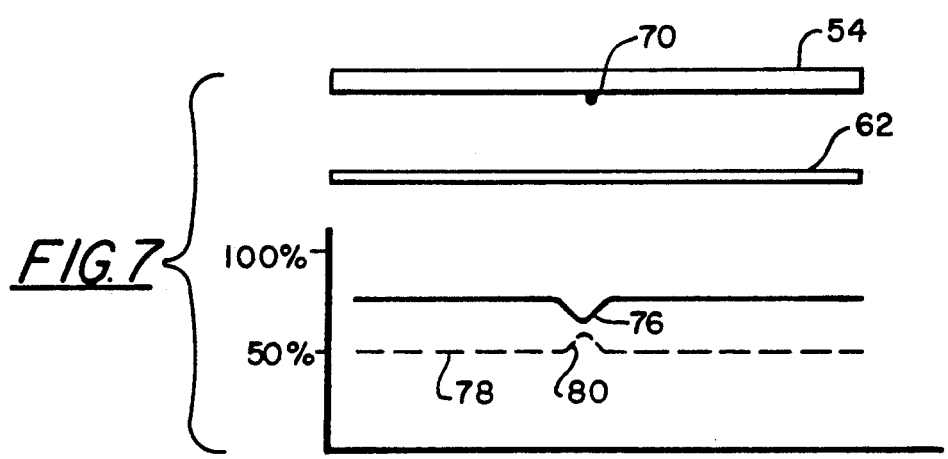

Having thus described the invention in general terms, reference will now be made to the accompanying drawings in which:

FIG. 1 is a top plan view of the drive mechanism forming part of a digitizing scanning apparatus constructed in accordance with and embodying the present invention;

FIG. 2 is a vertical sectional view taken along line 2—2 of FIG. 1;

FIG. 3 is a vertical sectional view partially in section and taken along line 3—3 of FIG. 1;

FIG. 4 is a schematic view showing a light distribution path in the digitized scanning apparatus of the present invention;

FIG. 5 is an enlarged fragmentary view showing the arrangement of a light source with respect to reflectors and a defuser and with respect to a document to be scanned;

FIG. 6 is a graphical illustration showing the light distribution compensation in accordance with a prior art apparatus; and FIG. 7 is a graphical illustration showing light distribution compensation in accordance with the present invention.

DETAILED DESCRIPTION OF A PREFERRED EMBODIMENT

Referring now in more detail and by reference characters to the drawings which illustrate a preferred embodiment of the present invention, 10 designates a drive mechanism forming part of a scanning apparatus constructed in accordance with and embodying the present invention.

FIG. 4 schematically illustrates certain of the components of the digitizing scanning apparatus. In this case, the drive mechanism 10 also comprises a light source 12 in the form of an elongate lamp. Light from the lamp 12 is passed through a defuser 14 and bounces from a prism 16 to a somewhat angulated mirror surface 18. The light from the mirrored surface is then bounced back through a collecting lens 20 and onto a charge coupled diode 22.

In accordance with this arrangement, it can be observed that light from the light source 12 projected onto the prism 16 and from the prism 16 to the mirrored surface 18 collectively adds to the light length of the light path. Thus, if a twelve inch light path were required for example, and seven inches of that light path were consumed by the distance from the lamp to the prism 16 and from the prism 16 to the mirror 18, it is only necessary to have a five inch light path from the mirrored surface 18 to the charged coupled diode 22. It can be observed that a document D is shown in a scanning path 24, as hereinafter described in more detail.

Referring now to FIGS. 1 through 3 of the drawings, the drive mechanism 10 is illustrated in more detail. This drive mechanism 10 comprises an upper frame 30, often referred to as an idler roller frame, and a lower frame 32 often referred to as a "drive roller frame". The idler roller frame 30 carries a plurality of longitudinally spaced apart idler rollers 34. These idler rollers 34 are mounted on roller shafts 36 which are suitably journaled in bearings 38 on each of the ends of the frame of 30. By reference to FIG. 2, it can be observed that each of the bearings 38 are somewhat floatable in large openings 40 which are formed within the frame walls 30. In this case, the bearings of 38 are vertically shiftable to a limited degree confined only by the size of the openings 40.

The bearings 38 are captured in the openings 40 so that they are, in effect, floatable therein but cannot escape beyond the outer ends of the frame 30. Moreover, an adjustment screw, in the form of a set screw 42, engages the lower end of each bearing so that the amount of movement of the bearing and hence the amount of movement of the idler rollers supported therein can be adjusted. The lower frame 32 is similarly provided with four longitudinally spaced apart drive rollers 44. Each of the drive rollers are mounted on drive shafts 46 which are journaled in bearings 48. In this case, the bearings 48 are not floatable. Thus, the drive rollers 44 are only rotatable. In accordance with the above-identified construction, it can be observed that a gap 50 is provided between the idler rollers 34 and the drive rollers 44.

The idler rollers 34 are made of a metal and have some weight relative to the document passing through the document path 50. The drive rollers 44 are formed of a rubber material or otherwise another material which is at least softer than the idler rollers 34. Thus, by maintaining the idler rollers 34, which are floatable with respect to the drive rollers 44, there is no fixed dimension of the gap 50. The gap size can vary depending upon the thickness of the document passing through the drive path. Thus, if a fairly thick document is moved through the drive path, the idler rollers 34 will be biased upwardly by a greater dimension than if a thinner document is passing through the document feeding path. In each case, however, there will be a constant amount of pressure on each document regardless of the thickness of that document.

Another unique advantage of the arrangement achieved is that the idler rollers never truly rest upon the drive rollers. There is always a gap between the idler rollers and the drive rollers. The size of the gap, however, is always less than the thickness of any document which would be moved through the gap. Accordingly, there will always be some upwardly biased movement of the idler rollers 34 as a document passes through the document path.

Inasmuch as the idler rollers 34 do not ever rest against the softer drive rollers 44, there will be no flat spots created in the drive rollers 44. Further, there will be no distortions as in the true circular arrangement of the drive rollers. Each of the four drive rollers are driven by a continuous drive chain connected to a single synchronous electric motor (not shown).

Guides 52 may be located between each of the idler rollers and the drive rollers in order to further define the document path and to maintain the document in an elongated position in the document path.

In accordance with the above-identified construction, it is possible to have a full width drive mechanism; that is, the idler rollers and drive rollers are driven for the full dimension of at least the width of the document passing through the document path. In accordance with this construction, it is possible to have essentially any width of document which is no longer than the length of the drive rollers and the idler rollers. Accordingly, a document of lesser width than the maximum length of the rollers could be provided and fed through the scanning apparatus. In addition, problems of alignment are obviated in that it is not necessary to properly align the document before passing the same through the scanning path. As a result, there is no need for side guides in order to keep the documents in a straight path.

Also extending between two rails forming part of the frame 30 is an elongate light source 54. This light source 54 may be an elongate florescent type lamp, or for that matter, an incandescent lamp. However, any light source which attempts to provide a relatively constant light distribution across its length is preferred.

The light source 54, in the form of an elongate lamp, is located between a pair of spaced apart reflector plates 56 which have interiorly presented reflector surfaces 58. These reflector plates 56 may be mounted on the opposite sides of the frame 30 and would extend along the length of the lamp 54. At their lower ends, the reflector plates 56 are each provided with a pair of slots 60 to receive a defuser 62. The defuser 62 is located so that it is very closely spaced to the image on the document D. In a preferred embodiment of the invention, the lower surface of the defuser 62 is about 0.020 inches from the document D. The defuser plate can be as close as practicably possible although it can vary up to 0.06 inches from the document D, but for best results it should not be spaced over a distance of 0.060 inches from the document D.

As indicated previously, one of the problems encountered in one prior art apparatus in attempting to integrate in order to account for dark spots in the light source was the fact that there was an improper integration. It was assumed that the dark spot would exist as a dark spot from the light source and would be projected as a dark spot on the document. However, in actuality the location of the document immediately beneath the dark spot also receives light from adjacent areas.

Referring to FIG. 6, it can be observed that a lamp 54 may have a dark spot 70 and which would be normally projected as a dark spot 72 on a document D. The lower portion of FIG. 6 represents a graph showing a possible 100 percent light distribution value when all discrete elements of light calibrated across one scan width is integrated. Theoretically, the integrated light distribution would be a straight line and which is arbitrary provided a 100 percent value. However, in FIG. 6, a light distribution is designated by the line 74. This line has a depression 76 representing a lower light value immediately beneath the spot 70. Theoretically, when fully integrated, that depression 76 would be integrated over the entire length of the line 74.

By using a defuser as shown in FIG. 7, it is possible to accurately integrate for that depression 76. It can be assumed for example, that the defuser allows 50 percent of the light from the lamp 54 to pass through. Thus, at a 50 percent level designated by dotted line 78, there would be a compensating peak 80 to affectively compensate for the depression 76. In this case, there would be a true integration or averaging of the light distribution over the length of the lamp 54.

In the prior art arrangement, the integration for the depression 76 caused a false light increase and resulted in streaks on the image. In effect, it is now possible to calibrate on the basis of the defuser which will normally provide about 50 to 60 percent of the light on the surface on the lamp. By averaging at the fast rate change of light, all errors are properly integrated out.

It should be pointed out that these dark spots are imperfections in the light source which may result from a mercury drop in the lamp or otherwise from phosphors in the lamp or for that matter, dark spots on the lamp itself. In effect, the light source is brought to the document surface by using this defuser. If the light source is very close to the defuser then the dark spot on the light source will create a true dark spot on the defuser since light will not project from any other area on this dark spot projected onto the defuser. However, by maintaining a distance of about 50/1000 of an inch, light will impinge upon the area of the defuser immediately beneath the dark spot on the lamp. When the light is passed through the defuser, there will be sufficient amount of scatter so that any imperfections will not be concentrated and will be scattered all over the length of the defuser.

The defuser is preferably has a smooth surface on both sides. Moreover, it is milky in color but has no granularity. As a matter of convenience, the defuser may be of a plastic sheet material.

Thus, there has been illustrated and described a unique and novel digitizing scanning apparatus which includes a unique drive means enabling the calibration of a document in a first pass and a reading of the document in a second pass with respect to a light source and a scanning element. This scanning apparatus also provides a unique drive means which maintains a constant amount of pressure on the document as it is being driven through the apparatus regardless of the thickness of the document. Further, the apparatus provides a unique light source to provide a true constant light distribution across each scanning section of a document as it is scanned. The apparatus therefore fulfills all of the objects and advantages which have been sought. It should be understood that many changes, modifications, variations, and other uses and applications will become apparent to those skilled in the art after considering this specification and the accompanying drawings. Therefore, any and all such changes, modifications, variations and other uses and applications which do not depart from the scope of the invention are deemed to be covered by the invention.

Having thus described my invention, what I desire to claim and secure by Letters Patent is:

1. A method of scanning a document and recording information thereon in digital format for later reproduction and which reproduction is in a form represented in the original document, said method comprising:
   a) passing a document in a first direction in a scanning path through a digitizing scanning apparatus between a source of light and a scanning element,
   b) examining a pixel value of areas of the document during the initial movement of the document through the scanning apparatus,
   c) integrating light distribution from a light source across the length of the light source located in a direction transverse to the movement of the document to provide a representative value of a constant light distribution,
   d) moving the document in a second direction directly opposite to the first direction and in the same scanning path, and
   e) reading the information on the document for digitization and recording thereof so that the document may be later reproduced in a form representative of the original document.

2. The method of claim 1 further characterized in that light and dark areas of the document are read in the first direction in order to enable calibration for all light and dark areas of the document.

3. The method of claim 1 further characterized in that the document is transmissive of light.

4. The method of claim 3 further characterized in that the document is an X-ray image containing document.

5. A digitizing scanning apparatus for scanning and recording an image for ultimate reproduction, said apparatus comprising:
   a) at least one drive roller located in a position generally transverse to a direction of movement of a document through the apparatus,
   b) at least one idler roller located above said drive roller also located in a direction generally transverse to the direction of movement of a document moving through the scanning apparatus,
   c) means for journaling said drive roller for rotation,
   d) bearing means for journaling said idler roller, said bearing means being vertically shiftable in a frame so that the idler roller may be biased upwardly by a thickness of the document passing between the idler roller and the drive roller and which may be biased downwardly by the weight of the idler roller,
   e) means for adjusting limits of the amount of movement of the idler roller, and
   f) means for causing rotation of the drive roller so that a document can be driven through the apparatus and scanned by a suitable scanning mechanism to enable recording and ultimate reproduction of the document.

6. The apparatus of claim 5 further characterized in that the apparatus comprises an elongate slot receiving the bearing means to allow the bearing means to shift in the elongate slot in response to the thickness of image.

7. The apparatus of claim 6 further characterized in that the means for adjusting the limits of the amount of movement comprises screw means which engages and bears against the bearing means.

8. The apparatus of claim 5 further characterized in that the document is transmissive of light.

9. A digitizing scanning apparatus for scanning and recording a document for ultimate reproduction, said apparatus comprising:
   a) means for moving a document passing through a scanning apparatus,
   b) means for detecting the information on the document for enabling digitization and recording of same,
   c) an elongate light source extending across said apparatus and having a length greater than the width of the document passing through said apparatus, said light source being located at a position so that it is transverse to the direction of movement of the document,
   d) a defuser which is translucent but not transparent and which reduces the amount of light from the light source which impinges on the document, said defuser having a surface located beneath said light source and intermediate the document and the light source, so that the defuser may effectively provide for integration of all light and dark spots on the light source and thereby effectively integrate an average light distribution of the light source at the surface of the defuser.

10. The digitizing scanning apparatus of claim 9 further characterizes in that said defuser is spaced from the document by the distance of no greater than 0.06 inches.

11. A digitizing scanning apparatus for scanning and recording an image in digital format for ultimate reproduction and which enable components necessary for creating a light path of sufficient length to be located in a small compact space, said apparatus comprising:
   a) means for moving a document to be scanned through the scanning apparatus and which document is transmissive of light radiation,
   b) a light source for lighting the image,
   c) a prism located at a distance beneath the document to receive a light beam in a first path passing from the light source to the prism and which prism is located in spaced apart relationship from the light source,
   d) the prism being arranged so that the light from the prism is bounced in a second patch and which second path has a generally horizontal component,
   f) a mirrored surface located to reflect the light from the prism to cause the light to move in a third path from the mirrored surface to the scanning element such that the image may be recorded and ultimately reproduced, whereby the first and second paths have directions different from the third path thereby enabling a shortening of the length of the third path.

12. A method of scanning and recording a document for ultimate reproduction, said method comprising:
   a) moving a document over a drive roller located in a position generally transverse to a direction of movement of a document through a scanning path,
   b) causing the document to be engaged on its upper surface by an idler roller located above said drive roller also in a direction generally transverse to the direction of movement of the document moving through the scanning path,
   c) allowing a bearing means which journals the idler roller to be vertically shiftable so that the idler roller may be biased upwardly by a thickness of the document passing between the idler roller and the drive roller and downwardly by the weight of the idler roller, and
   d) adjusting the limits of the amount of movement of the idler roller.

13. A method of scanning and recording an image in digital format for ultimate reproduction in a small scanning path and which enables components necessary to be located in a small compact space, said method comprising:
   a) moving a document to be scanned through the scanning path and which document is transmissive of light radiation,
   b) locating a prism a distance beneath the document to receive a light beam in a first path passing from a source of light to the prism in spaced apart relationship from the source of light,
   c) bouncing the light from the prism in a second path and which second path has a generally horizontal component, and
   d) bouncing the light from the prism off of a mirrored surface and crushing the light to move in a third path from the mirrored surface to be scanning element such that the image may be recorded and ultimately reproduced, whereby the first and second paths have directions different from the third path thereby enabling a shortening of the length of the third path.

14. A method of scanning and recording an image for ultimate reproduction, said method comprising:
   a) moving a document through a scanning path,
   b) detecting the information on the document and, digitizing and recording the information detected on the document,
   c) illuminating the document with an elongate light source extending across said scanning path with a width greater than the document passing through said scanning path, and with the light source being located at a position so that it is transverse to the direction of movement of the document, and
   d) diffusing the light from the light source before it contacts the document by a defuser located beneath said light source and intermediate the document and the light source to effectively provide for integration of all light and dark spots on the light source and thereby effectively integrate the average light distribution and the light source at the surface of the defuser.

* * * * *